(12) United States Patent
Shinohara et al.

(10) Patent No.: US 7,136,106 B1
(45) Date of Patent: Nov. 14, 2006

(54) APPARATUS CONTROLLER, DEVICE AND METHOD FOR CONTROLLING DATA TRANSMISSION OF DIGITAL APPARATUS, AND DATA TRANSMISSION CONTROL SYSTEM

(75) Inventors: Toshiaki Shinohara, Omiya (JP); Masahiro Wakamori, Yokohama (JP); Kengo Tsuzuki, Machida (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/762,387

(22) PCT Filed: Aug. 6, 1999

(86) PCT No.: PCT/JP99/04271

§ 371 (c)(1),
(2), (4) Date: Feb. 7, 2001

(87) PCT Pub. No.: WO00/08809

PCT Pub. Date: Feb. 17, 2000

(30) Foreign Application Priority Data

Aug. 7, 1998 (JP) ................................ 10-234886

(51) Int. Cl.
*H04N 7/18* (2006.01)
*H04N 7/04* (2006.01)

(52) U.S. Cl. .................... 348/423.1; 348/512; 348/153; 348/14.12; 725/90

(58) Field of Classification Search ................ 348/512, 348/500, 515, 537, 510, 518, 552, 423.1, 348/425.4, 14.11, 14.12, 14.13, 153, 159, 348/64, 14.01; 370/278, 282; 386/109, 386/111, 117, 98; 375/240.26, 240.28, 240.25; 725/90, 93, 98; 709/229, 400
See application file for complete search history.

(56) References Cited

U.S. PATENT DOCUMENTS 5,365,265 A * 11/1994 Shibata et al. ............. 348/14.1
5,535,208 A * 7/1996 Kawakami et al. ......... 370/391
5,646,941 A * 7/1997 Nishimura et al. ......... 370/389

(Continued)

*Primary Examiner*—John Miller
*Assistant Examiner*—Jean W. Désir
(74) *Attorney, Agent, or Firm*—Connolly Bove Lodge & Hutz LLP

(57) ABSTRACT

According to the present invention, when an image data currently being received is switched over to the data from another image information device, the best picture quality is provided without stopping the image up to the next I frame even when the switching request is given at the middle of I frame. The apparatus of the invention comprises a clock processing unit 103 for generating a current time corrected according to an information of a time received from a system controller 107 via a network 101, a transmitting/receiving processing unit 102 for transmitting and receiving data and control signal to and from the network, a time designation processing unit 104 for setting the designation time received from the system controller via the network, and a designation time detection processing unit 105 for comparing the preset designation time with the current time, and when the designation time agrees with the current time, the received data is switched over, and the switching is synchronized with the next I frame.

20 Claims, 13 Drawing Sheets

U.S. PATENT DOCUMENTS

| | | | |
|---|---|---|---|
| 5,701,581 A * | 12/1997 | Eto et al. | 348/14.13 |
| 5,867,626 A * | 2/1999 | Kawakami et al. | 386/108 |
| 5,990,967 A * | 11/1999 | Kawakami et al. | 348/500 |
| 6,014,765 A * | 1/2000 | Maeda et al. | 714/748 |
| 6,133,941 A * | 10/2000 | Ono | 348/14.05 |
| 6,208,376 B1 * | 3/2001 | Tanaka et al. | 348/153 |
| 6,275,537 B1 * | 8/2001 | Lee | 375/240.28 |
| 6,313,863 B1 * | 11/2001 | Chida | 348/14.01 |
| 6,438,165 B1 * | 8/2002 | Normile | 375/240 |
| 6,516,002 B1 * | 2/2003 | Huang et al. | 370/468 |
| 6,580,451 B1 * | 6/2003 | Yonezawa et al. | 348/159 |

* cited by examiner

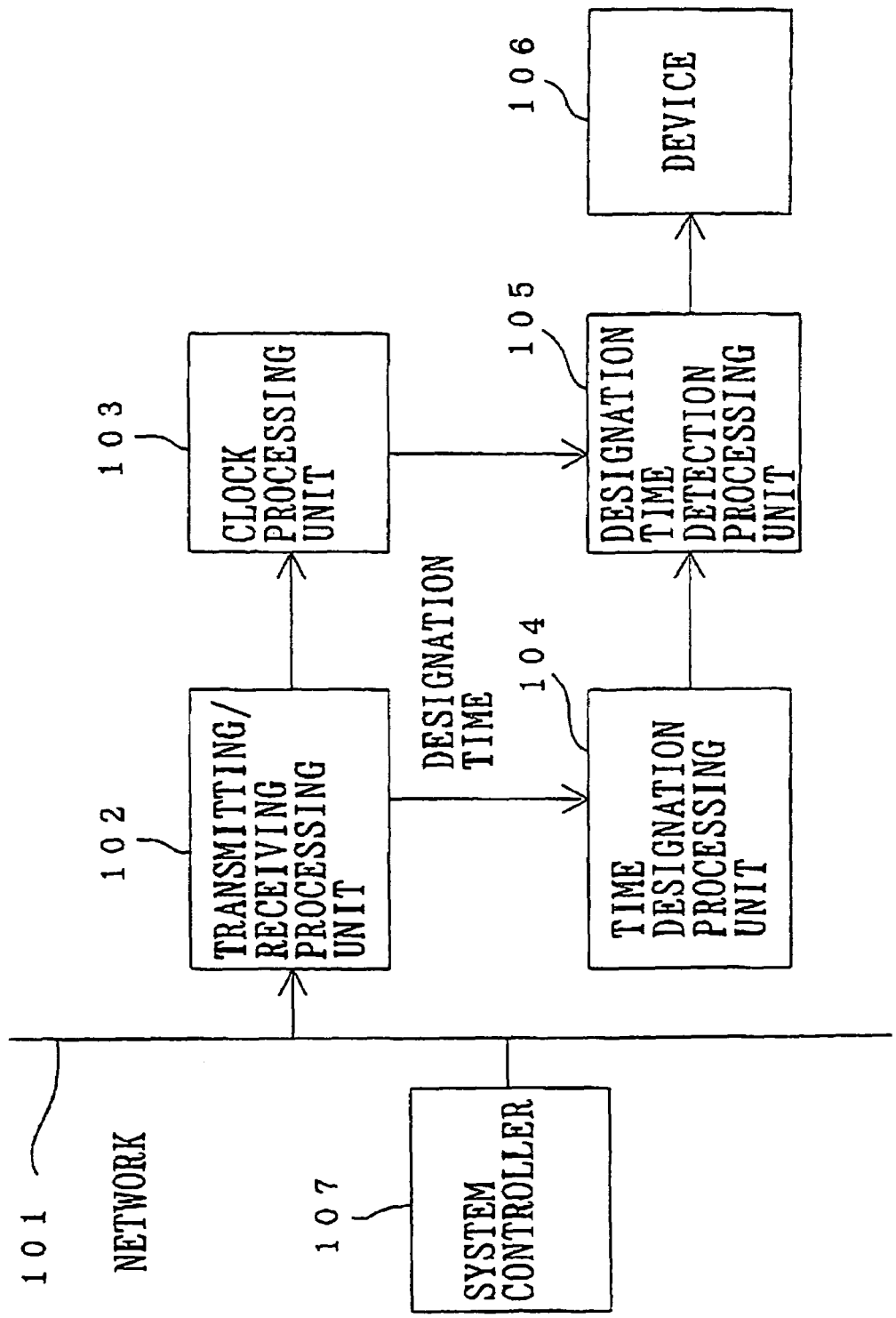

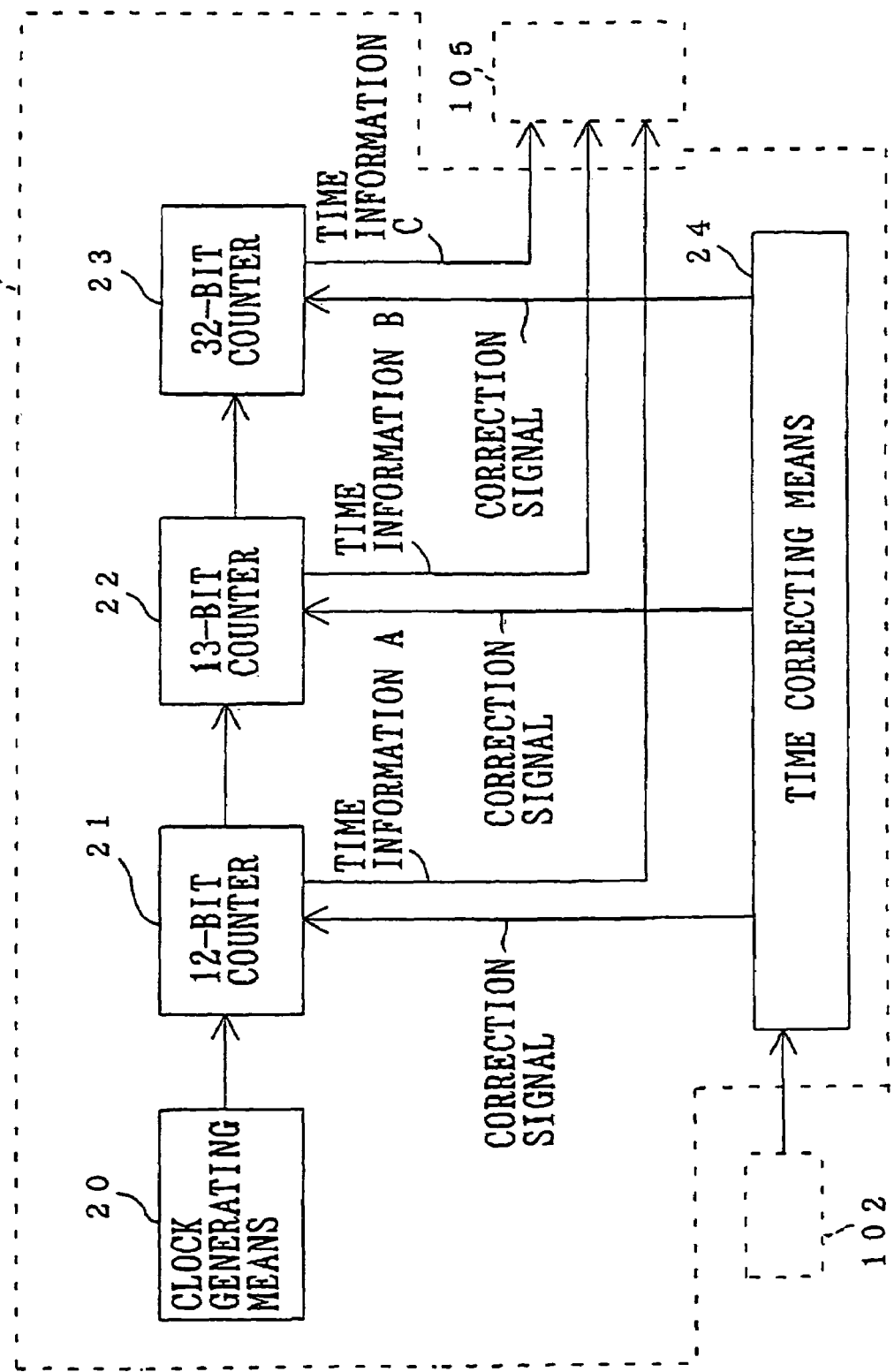

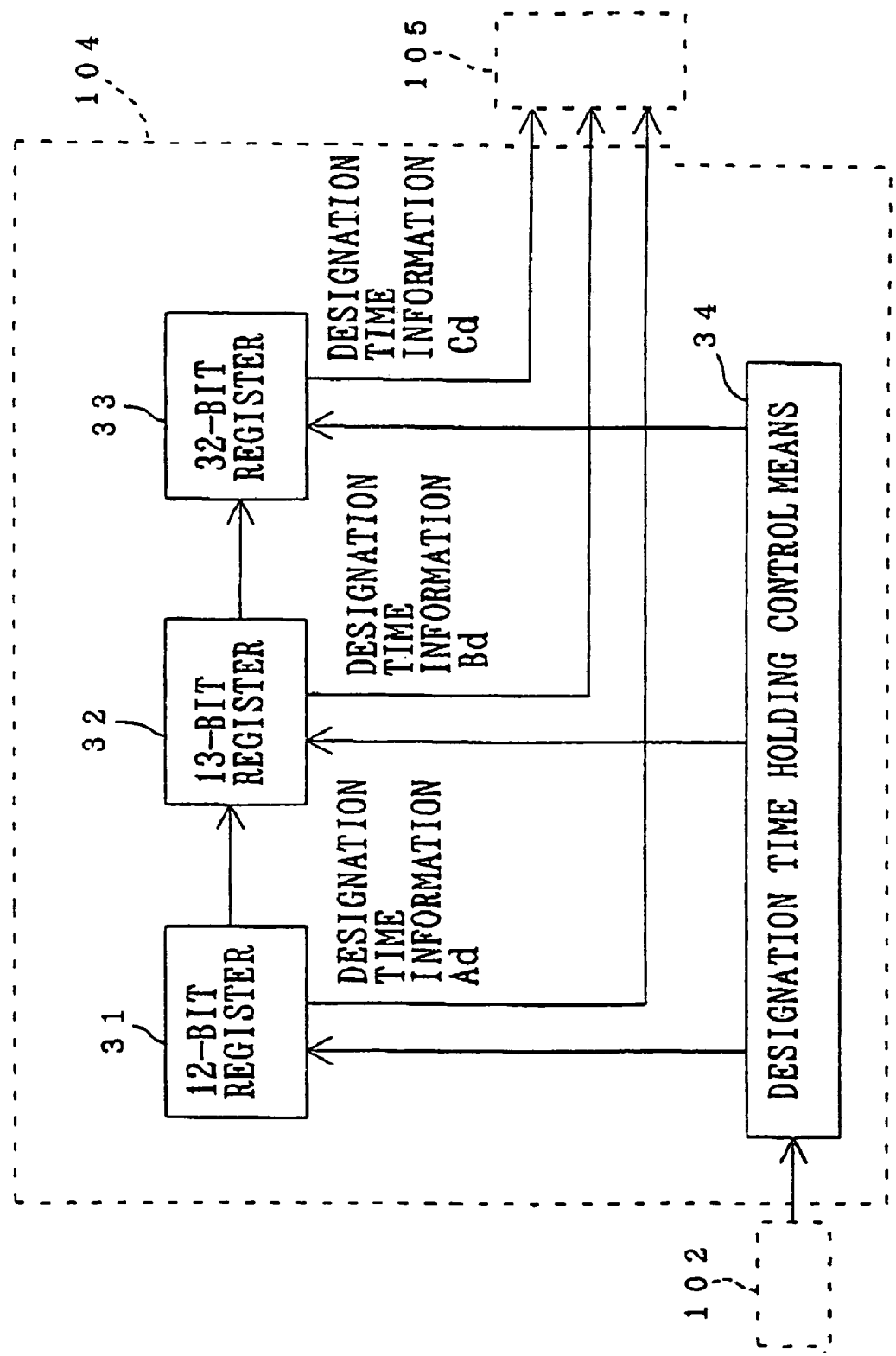

APPARATUS CONTROLLER, DEVICE AND METHOD FOR CONTROLLING DATA TRANSMISSION OF DIGITAL APPARATUS, AND DATA TRANSMISSION CONTROL SYSTEM

TECHNICAL FIELD

The present invention relates to a device control apparatus, data transmission control apparatus and data transmission control method for use with a digital device, and to a data transmission control system. In particular, the invention relates to an apparatus and a method for data transmission control for a digital device to control data transmission between a digital device such as digital camera and monitoring means for monitoring the device.

BACKGROUND ART

In a method for operating a digital device of this type, it has been practiced in the past that the digital device such as a camera is operated by a command based on an instruction packet from operation/control means such as a personal computer, or the digital device is triggered by the control from external control means.

As a conventional method for transmitting a digital data such as an image data, a data transmission method has been known, which can transmit the data efficiently according to an image data compression technique such as MPEG.

However, (1) in the conventional method for operating the digital device as described above, when the operation of the digital device is controlled by an instruction packet as described above, much time is required, e.g. a time to generate the instruction packet, a time to transmit the instruction packet, a time to interpret the instruction packet, and a time to execute the instruction. In this respect, there has been a problem in that the timing to operate the device cannot be accurately controlled by the instruction packet.

Also, when it is tried to trigger the digital device by the control from external control means, complicated wiring is required such as the wiring for a separate signal line.

(2) In the conventional transmission method for transmitting digital data as described above, when the data amount to be transmitted rapidly is increased, the data cannot be sent out within the anticipated time. In such case, particularly when a network is shared with other devices based on time division multiplex system, competition of the packet may occur if the sending of the data is not stopped within the scheduled time.

(3) When an image compression technique such as MPEG is used and the image data is compressed using an information of the changes between frames, a system is adopted to use an information of I frame (compressed and coded image within a frame) and to express the changes of a series of the subsequent image data, using the image data as a starting point.

However, according to this system, when multiplex transmission is performed for the image data from a plurality of image information devices such as camera on a single transmission route, the receiving of the image data from an image information device currently in transmission should be stopped and it should be switched over to the receiving of the image data from another image information device. When the receiving of the information of the switched image data is started from the middle of I frame, the image data cannot be constructed until the next I frame is received. Thus, the image is interrupted at the switching of the image information devices.

(4) Also, when a plurality of data transmitting devices such as photographing means and a plurality of data receiving devices such as monitoring means are connected over the network, and when transmission is requested individually from the data receiving device to the data transmitting device, it is necessary at first to inquire operating condition and channel of the data transmitting device. This results in the increase of traffic and leads to the increase of the processing amount of each device.

(5) When a data receiving device switches over the data transmitting device via a trunk line of the network, it has been practiced in the past that the data receiving device connected to the local bus transmits only the necessary data by connecting packet transmission control means between the local bus and the trunk line because data transmission in the local bus is not so rapid as in the trunk line of the network. Under the condition that the necessary data varies according to the time, and when data transmitting device is switched over by means such as instruction, there may occur error in the period from the sending of the switching instruction to the actual switching, and this means that it is not possible to control accurately.

(6) In the system to transmit the compressed data by controlling compression rate in such manner that the data amount averaged by time is on a constant level, there is no surplus time between the data groups to be transmitted. In this respect, when the data group is switched over to the next group, the compressed data after a certain data amount must be cut off.

SUMMARY OF THE INVENTION

To solve the above problems in the conventional technique, it is a first object of the present invention to provide an apparatus and a method for data transmission control for a digital device, by which it is possible to accurately control operation of the digital device at a predetermined timing without using an instruction packet for the operation of the digital device. This is accomplished by setting a designation time to operate the device from outside in advance, by providing means for detecting the designation time, and by operating the digital device when the designation time is detected.

It is a second object of the present invention to provide an apparatus and a method for data transmission control for a digital device, by which it is possible to use a transmission route at the highest efficiency without competing with the transmission of the data to be transmitted next from other device. This is accomplished by setting a time for completion of transmission of data in advance, and by stopping operation of the digital device when the time is reached.

It is a third object of the present invention to provide an apparatus and a method for data transmission control for digital device, by which it is possible to provide the highest picture quality without interrupting construction of the image during the process from the request to switch over the image data to I frame when the receiving of the image data from the image information device currently in transmission is stopped and it is switched over to the receiving of the image data from the other image information device. This is accomplished by postponing the switching of the image data to the next I frame and by performing the switching in synchronization even in case the switching request is made in the middle of I frame.

It is a fourth object of the present invention to provide an apparatus and a method for data transmission control for digital device, by which it is possible to increase the efficiency to utilize the network by controlling the data transmission using a manager depending on the conditions of data or data transmission without individually inquiring to the data transmitting device from the data receiving device. This is accomplished by connecting the manager for controlling the data transmission to the network, to which a plurality of data transmitting devices such as photographing means and a plurality of data receiving devices such as monitoring means are connected, and by performing the scheduling of the data transmission between the devices.

It is a fifth object of the present invention to provide an apparatus and a method for data transmission control for a digital device, by which it is possible to accurately control the switching operation of the packet for transmission in synchronization with the best timing as determined in advance. This is accomplished by setting a designation time for switching the packet transmitted from outside in advance, and by switching over in synchronization with the time.

It is a sixth object of the present invention to provide an apparatus and a method for data transmission control for a digital device, by which it is possible to avoid the cutting-off of the transmission data at the switching of the data group to be transmitted. This is accomplished by setting the data amount to be transmitted to a lower value than the transmissible data amount, by transmitting the data group within the shortest time, and by providing free time until the initiation of the transmission of the next data group.

In the data transmission control apparatus for a digital device of the present invention, a designation time to operate the device from outside is set in advance, and there is provided means for detecting the designation time, and the device is operated when the designation time is detected.

According to the present invention, a data transmission control apparatus for a digital device can be obtained, by which it is possible to accurately control the operation of the digital device at a predetermined timing without using instruction packet for the operation of the digital device.

In the data transmission control apparatus for a digital device according to the present invention, a designation time to designate the time of the completion of data transmission is set in advance in data transmission from the device, and there is provided means for detecting the designation time, and operation of the device is stopped when the time is detected.

According to the present invention, a data transmission control apparatus for a digital device can be obtained, by which it is possible to use a transmission route at the highest efficiency without competing with the transmission of the next data to be transmitted from other device.

In the data transmission control apparatus for a digital device according to the present invention, a designation time to designate the time to switch over photographing/transmitting means is set in advance to a request to switch over the photographing/transmitting means in the transmission of image data from the photographing/transmitting means to monitoring means, there is provided means for detecting the designation time, and the time to switch over the image data is synchronized with the detection of the waiting designation time by waiting until the next I frame even when the receiving of the image data from the photographing/transmitting means currently being transmitted is stopped and the request to switch over to the receiving of the image data from the other image information device is given in the middle of I frame.

According to the present invention, a data transmission control apparatus for a digital device can be obtained, by which it is possible to provide the highest picture quality without interrupting construction of the image during the process from the request to switch over the image data to be transmitted from the photographing/transmitting means to I frame.

In the data transmission control system for a digital device according to the present invention, a manager for controlling the data transmission is connected to the network, to which a plurality of data transmitting devices such as photographing means and a plurality of data receiving devices such as monitoring means are connected, and scheduling is performed for the data transmission between the devices.

According to the present invention, a data transmission control system for a digital device can be obtained, by which it is possible to increase transmission efficiency through the control of data transmission by the manager depending upon the conditions of data or data transmission without individually inquiring to the data transmitting device from the data receiving device.

In the data transmission control apparatus for a digital device according to the present invention, when the device to transmit the data is switched over at a request from the device for receiving the data, a designation time to switch over the device for transmitting the data is set from a controller, and the device for transmitting the data is switched over in synchronization with the time.

According to the present invention, a data transmission control apparatus for a digital device can be obtained, by which it is possible to accurately control the operation of the device for transmitting the data and the device for receiving the data in synchronization with the best timing determined in advance.

In the data transmission control method for a digital device according to the present invention, the data amount to be transmitted is set to a lower value than the transmissible data amount, one data group is transmitted within the shortest time, and there is provided free time until the initiation of the transmission of the next data group.

According to the present invention, a data transmission control method for a digital device is provided, by which it is possible to avoid the cutting-off of the transmission data at the switching of the data group to be transmitted in the data transmission where the data amount to be transmitted is indefinite.

The device control apparatus according to the present invention comprises a clock processing unit for generating a current time corrected according to an information of a time received from a system controller via a network, a time designation processing unit for setting a designation time received from the system controller via the network, and a designation time detection processing unit for comparing the preset designation time with the current time, whereby, when the preset designation time is reached as the result of the comparison, the operation of the device is controlled. In this respect, it is possible to accurately control the operation of the digital device at the designation time with a predetermined timing.

The data transmission control apparatus according to the present invention comprises a clock processing unit for generating a current time corrected according to an information of a time received from a system controller via network, a transmitting/receiving processing unit for transmitting and receiving data and control signal to and from the network, a time designation processing unit for setting a designation time received from the system controller via the network, and a designation time detection processing unit for comparing the preset designation time with current time, whereby, when the preset designation time is reached as the result of the comparison, transmission of the data from the device is stopped by the transmitting/receiving processing unit. In this respect, it is possible to use a transmission route at the highest efficiency without competing with transmission of the data to be transmitted next from the other device.

The data transmission control apparatus according to the present invention comprises a clock processing unit for generating a current time corrected according to an information of a time received from a system controller via a network, a transmitting/receiving processing unit for transmitting and receiving data and control signal to and from the network, a time designation processing unit for setting a designation time received from the system controller via the network, and a designation time detection processing unit for comparing the preset designation time with the current time, whereby, when the designation time is compared with the current time and these values agree with each other, the compressed image data of I frame is sent out. When there is a request to switch over the photographing/transmitting means from the monitoring means, the designation time for switching is postponed to the next I frame. Thus, it is possible to provide the highest picture quality without interrupting the construction of the image.

The data transmission control apparatus according to the present invention comprises a clock processing unit for generating a current time corrected according to an information of a time received from a system controller via a network, a transmitting/receiving processing unit for transmitting and receiving data and control signal to and from the network, a time designation processing unit for setting a designation time received from the system controller via the network, and a designation time detection processing unit for comparing the preset designation time with the current time, whereby, when the preset designation time is compared with the current time and these values agree with each other, the data to be received is switched over. In this respect, when there is a request to switch over the photographing/transmitting means from the monitoring means, I frame is inserted without waiting until the next I frame, and it is possible to provide the highest picture quality without interrupting the construction of the image.

The data transmission control system according to the present invention comprises an arbitrary number of data transmission control apparatuses according to claim 3 and the data transmission control apparatuses according to claim 4, the data transmission control apparatuses are connected with each other over a network, whereby compressed image data received is switched over at a timing of transmission of an image data of I frame, which constitutes compressed image on the receiving side. In this respect, when there is a request to switch over the photographing/transmitting means from the monitoring means, the designation time for switching is postponed to the next I frame. Thus, it is possible to provide the highest picture quality without interrupting the construction of the image.

The data transmission control system according to the present invention, which is for use in a case wherein a plurality of devices for transmitting and a plurality of devices for receiving compressed image data are connected with each other over a network, said system is arranged such that when the compressed image data received on the receiving device is switched over, it is requested to send out I frame of compressed image data constituting the compressed image to the device for sending the compressed image data to be received newly, and compressed image data of I frame is transmitted within the shortest time to the receiving device. When there is a request to switch over the photographing/transmitting means from the monitoring means, the designation time for switching is postponed until the next I frame, and it is possible to provide the highest picture quality without interrupting the construction of the image.

The data transmission control system according to the present invention comprises a manager connected to a network, to which a plurality of photographing/transmitting means and a plurality of monitoring means are connected, and the manager performs scheduling of data transmission between the plurality of photographing/transmitting means and the plurality of monitoring means. In this respect, it is possible to increase transmission efficiency by performing the scheduling for the data transmission by a manager according to the conditions of data or data transmission without individually inquiring to the data transmitting device from the data receiving device.

In the data transmission control system according to the present invention, in the scheduling by the manager, the sending of I frame of compressed image data is thinned out. Thus, it is possible to provide the better picture quality without sending I frame but by elaborately sending P frame instead.

The data transmission control apparatus according to the present invention comprises the data transmission control apparatus according to claim 1, whereby the apparatus is connected between a device receiving data and a network, and the data to be relayed is switched over when a preset designation time is detected. Thus, it is possible to accurately control the operation of the device for sending the data and the device for receiving data in synchronization with the best timing determined in advance.

The data transmission control method according to the present invention comprises the steps of setting data amount of image data including I frame constituting the compressed image to a value lower than a transmissible data amount, and providing free time up to arrival of the next data group. Thus, it is possible to avoid the cutting-off of transmission data at the switching of the data group to be transmitted in the data transmission where the data amount to be transmitted is indefinite.

In the data transmission control apparatus according to the present invention, information of the designation time is maintained in the device in advance. Thus, it is possible to easily utilize the designation time.

BRIEF DESCRIPTION OF THE DRAWINGS

FIG. 1A is a block diagram showing an arrangement of a data transmission control apparatus in an embodiment 1 of the present invention;

FIG. 1B is a block diagram showing an arrangement of a clock processing unit in FIG. 1A;

FIG. 1C is a block diagram showing an arrangement of a time designation processing unit in FIG. 1A;

BEST MODE FOR CARRYING OUT THE INVENTION

Figure 1D:
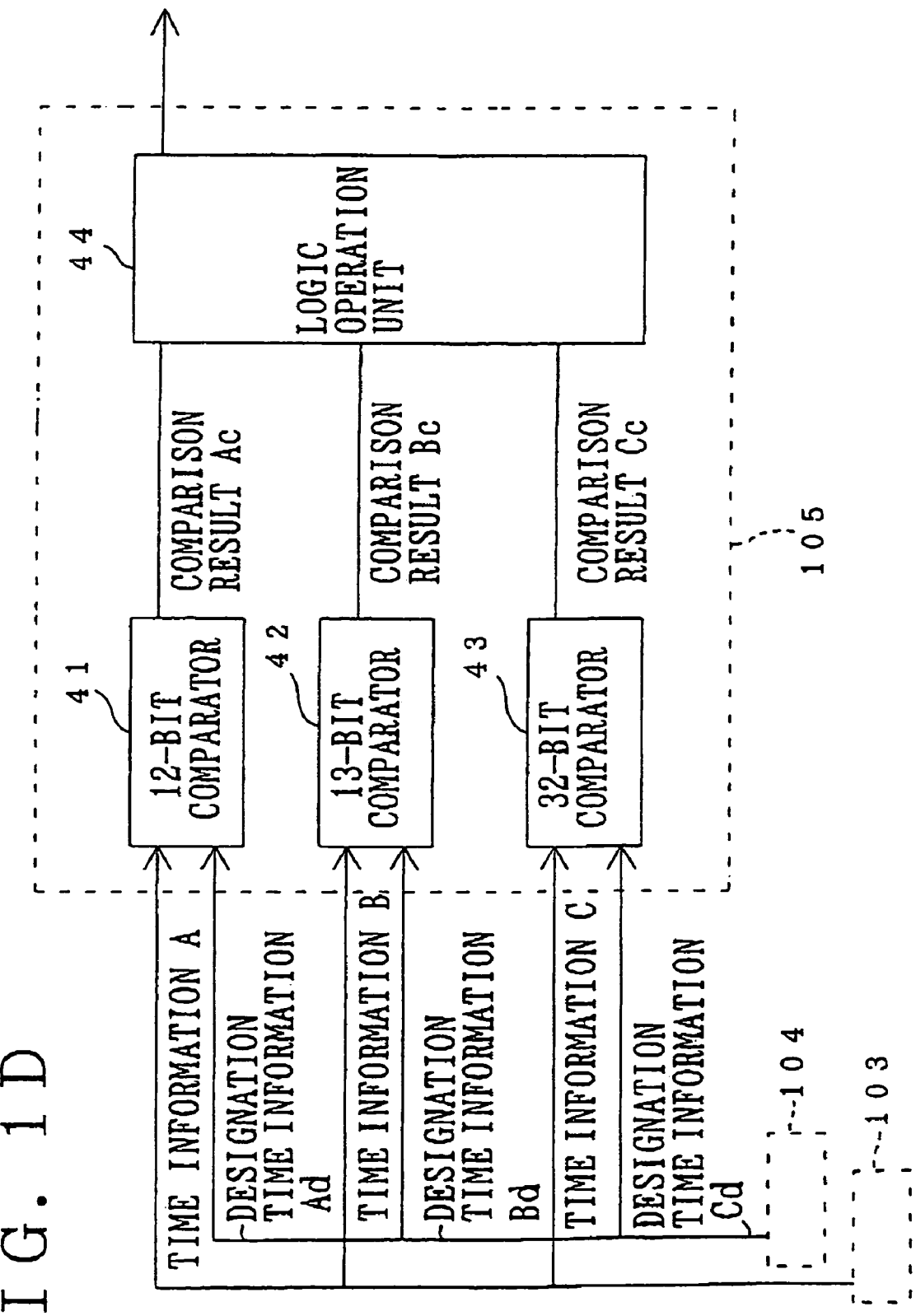
FIG. 1D is a block diagram showing an arrangement of a designation time detection processing unit in FIG. 1A.

In the following, detailed description will be given on embodiments of the present invention referring to the attached drawings FIG. 1 to FIG. 10.

Embodiment 1

First, referring to FIG. 1A, description will be given on a data transmission control apparatus in an embodiment 1 of the present invention. FIG. 1A is a block diagram showing an arrangement of a data transmission control apparatus in the embodiment 1 of the present invention. In FIG. 1A, reference numeral 101 denotes a network for connecting to other digital devices, and 102 represents a transmitting/receiving processing unit for transmitting and receiving data to and from the other digital devices.

Reference numeral 103 denotes a clock processing unit for generating a current time corrected according to a time of a packet indicating the received time, 104 is a time designation processing unit for setting the received designation time, 105 is a designation time detection processing unit for outputting a designation time detection signal when the current time from the clock processing unit 103 is compared with the designation time from the time designation processing unit 104 and the two values agree with each other. Reference numeral 106 denotes a digital device (hereinafter also called "device") with its operation placed under control when the designation time detection signal is received, and 107 indicates a system controller for controlling the entire apparatus connected to the network 101. The digital device with its operation under control is a digital camera, for example. That is, when a user wants to release the shutter of a digital camera at a desired time, it is possible according to the present invention to control it at the desired time.

Next, referring to FIG. 1A, description will be given on operation of the data transmission control apparatus in the embodiment 1. First, the designation time is received from the system controller 107 via the transmitting/receiving processing unit 102, and this is set to the time designation processing unit 104. On the other hand, the clock processing unit 103 receives a packet indicating the time via the transmitting/receiving processing unit 102 at a predetermined time interval and outputs a current time corrected from the above time to the designation time detection processing unit 105. The designation time detection processing unit 105 receives the current time and, at the same time, receives a designation time from the time designation processing unit 104 and compares these two values. When the values agree with each other, a designation time detection signal is outputted to the digital device 106. The digital device 106 receives the designation time detection signal, and its operation is controlled.

Now, detailed arrangement of the clock processing unit 103 is shown in FIG. 1B, and the operation is described. Reference numeral 20 denotes clock generating means for generating a pulse of 24.576 MHz. Reference numeral 21 is a 12-bit counter, which counts the inputted pulses, and when 3072 pulses have been counted, it generates a carry signal as an output pulse. Then, the count value is returned to 0, and the counting of pulses is continued. The count value is outputted as a time information A. Reference numeral 22 denotes a 13-bit counter for counting the output pulses of the 12-bit counter 21. When 8000 pulses have been counted, a carry signal is generated as an output pulse. The count value is returned to 0, and the counting of the pulses is continued again. The count value is outputted as a time information B. Reference numeral 23 is a 32-bit counter for counting the output pulses of the 13-bit counter 22, and the count value is outputted as a time information C. Here, it is assumed that the current time is a time expressed by the following equation using the time information A, the time information B, and the time information C:

The current time=Time information $A$×(time for one cycle of 24.576 MHz)+Time information $B$×(125 μsec)+Time information $C$ Therefore, the current time has an accuracy of the time of one cycle of 24.576 MHz.

Reference numeral 24 denotes time correcting means, which interprets a packet indicating the time given from the transmitting/receiving processing unit 102 and generates a correction signal for correcting each count value from the counters 21 to 23 based on the information contained in the packet. It is supposed that this packet is transmitted from another device (not shown) connected to the system controller 107 or the network 101 in FIG. 1A. In the packet to indicate the time, count values of the counters 21 to 23 are described according to a predetermined format. At the time correcting means 24, these count values are written to the counters 21 to 23. Thus, correction is performed in such manner that the information on the current time outputted from the clock processing unit 103 is equalized to the time indicated by the packet.

In the above arrangement, the time information A using the time of one cycle of 24.576 MHz as unit, the time information B using 125 μsec as unit, and the time information C using one second as unit are outputted as the information of the current time in synchronization with the clock signal from the clock generating means 20. The count values of the counters 21 to 23 are corrected by time correcting means 24 each time a packet to indicate the time is given from the transmitting/receiving processing unit 102, and the information of the current time is corrected so that it agrees with the time designated by the packet. If it is assumed that the packet is transmitted at a cycle of 125 μsec, the current time has an accuracy of the time of one cycle of 24.576 MHz (approximately $4\times10^{-8}$ seconds), and it is corrected at a frequency, at which the packet including the time information is transmitted (at every 125 μsec in the present example), and it is possible to provide accurate current time at all times.

Detailed arrangement of the time designation processing unit 104 is shown in FIG. 1C, and operation is described below. In FIG. 1C, reference numeral 34 denotes designation time holding control means, which interprets the packet to indicate the designation time given from the transmitting/receiving processing unit 102 and sets the values of registers 31 to 33 from the information contained in the packet. Reference numeral 31 is a 12-bit register, and its holding value is outputted as a designation time information Ad.

Reference numeral 32 indicates a 13-bit register, and its holding value is outputted as a designation time information Bd. Reference numeral 33 represents a 32-bit register, which takes a value expressed as 32 bits, and its holding value is outputted as a designation time information Cd. Here, the values of the designation time information Ad to Cd correspond respectively to the values of the time information A to C as explained in connection with FIG. 1B. The designation time information Ad takes a value from 0 to 3071 using the time of one cycle of 24.576 MHz as unit. The designation time information Bd takes a value from 0 to 7999 using 125 μsec as unit. The designation time information Cd takes a value of 32 bits using a second as unit. The designation time is expressed by the following equation:

The designation time=Designation time information $Ad \times$ (time of one cycle of 24.576 MHz)+Designation time information $Bd \times$ (125 μsec)+Designation time information $Cd$ Here, detailed arrangement of the designation time detection processing unit 105 is shown in FIG. 1D, and the operation is described below. In FIG. 1D, reference numeral 41 denotes a 12-bit comparator. The time information A described in connection with FIG. 1B is compared with the designation time information Ad described in connection with FIG. 1C, and the comparison result Ac is outputted. Reference numeral 42 is a 13-bit comparator. The time information B described in connection with FIG. 1B is compared with the time information Bd described in connection with FIG. 1C, and a comparison result Bc is outputted.

Reference numeral 43 represents a 32-bit comparator. The time information C described in connection with FIG. 1B is compared with the designation time information Cd described in connection with FIG. 1C, and a comparison result Cc is outputted.

Reference numeral 44 denotes a logic operation unit. Based on the logic of the comparison results Ac to Cc, it is detected that the current time has passed over the designation time, and this is notified to the device 106. The logic operation unit 44 detects that the designation time has elapsed when one of the following conditions is established:

Condition 1=(Time information $C$>Designation time information $Cd$)

Condition 2=(Time information $C$=Designation time information $Cd$); and (Time information $B$>Designation time information $Bd$)

Condition 3=(Time information $A$>Designation time information $Ad$); (Time information $B$=Designation time information $Bd$); and (Time information $C$=Designation time information $Cd$)

In the above arrangement, all of the time information and designation time information are compared. However, if only the condition 1 is used, for example, the scale of the circuit can be reduced even though the designation time is detected in the unit of second.

Now, description will be given on the packet to indicate the time as given from the transmitting/receiving processing unit 102 to the clock processing unit 103. As the packet to indicate the time, there are two types of packets, i.e. packet A and packet B. The packet A is given from the transmitting/receiving unit 102 to the clock processing unit 103 at every 125 μsec at the shortest. The packet B is transmitted at a frequency lower than the packet A such as the time of initialization of the device.

The packet A corresponds to a cycle start packet in the standards IEEE 1394, for example.

The information of the time included in the packet A:
Value of the counter 21 (12 bits)
Value of the counter 22 (13 bits)
Value of lower 7 bits in the counter 23 (7 bits)
The information of the time included in the packet B:
Value of the counter 23 (32 bits)

In the data transmission control apparatus of the embodiment 1 with the arrangement as described above, it is possible to provide a data transmission control apparatus for a digital device, which does not use an instruction packet for a command to operate the digital device and which can accurately control the operation of the digital device at a predetermined timing. It may be designed in such manner that a designation time is stored in the time designation processing unit 104 in advance.

Embodiment 2

Figure 2:
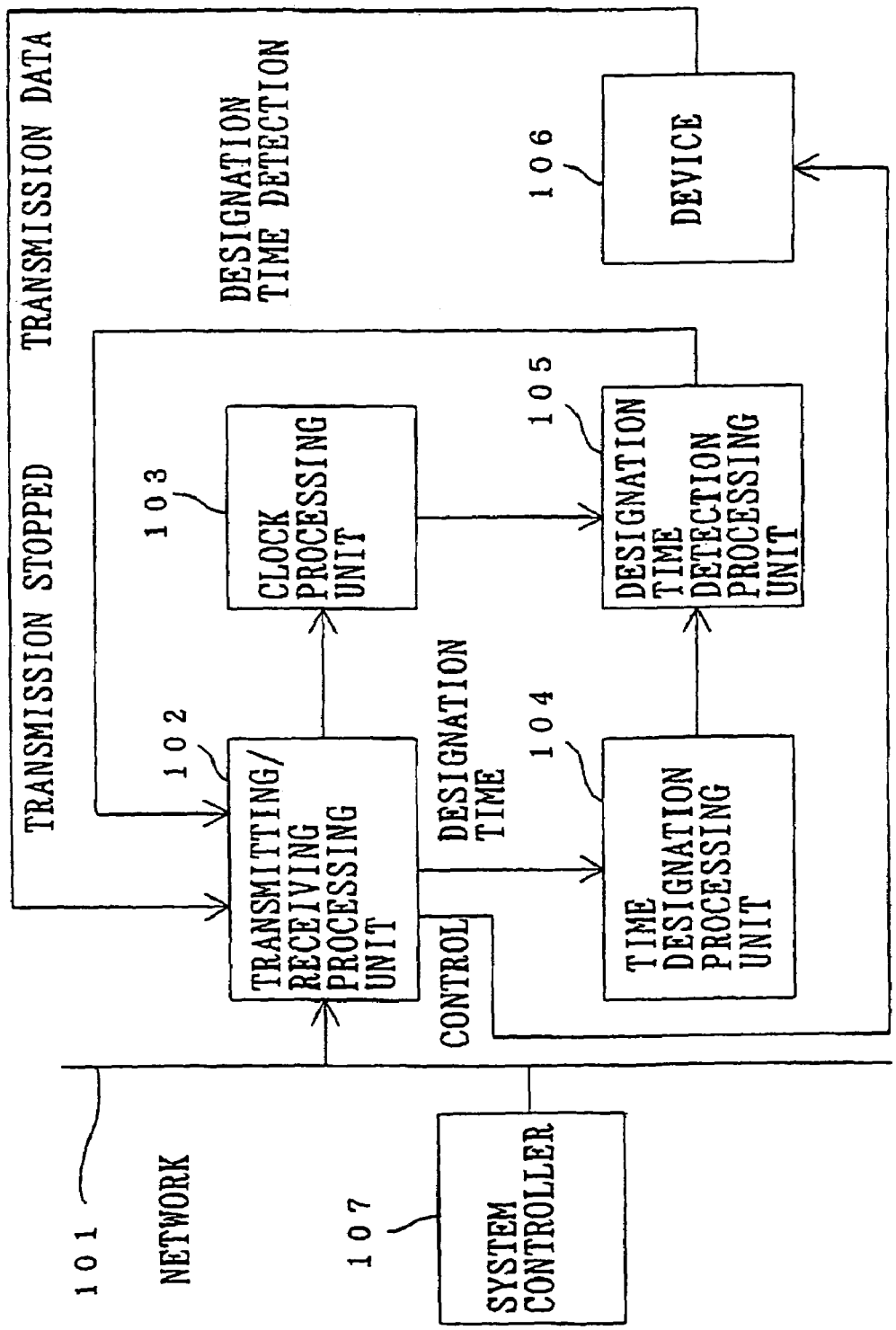
FIG. 2 is a block diagram showing an arrangement of a data transmission control apparatus in an embodiment 2 of the present invention.

Next, referring to FIG. 2, description will be given below on a data transmission control apparatus of an embodiment 2 of the present invention. FIG. 2 is a block diagram showing an arrangement of a data transmission control apparatus in the embodiment 2 of the present invention. In FIG. 2, reference numeral 105 denotes a designation time detection processing unit for comparing the current time with a designation time to designate a time to stop transmission of data from a device 106 and for outputting a designation time detection signal when these time values agree with each other. Reference numeral 106 is a digital device for outputting the transmission data to a transmitting/receiving processing unit 102 regardless of whether the designation time detection signal is generated or not. For the other components having the same symbols as those shown in FIG. 1, detailed description is not given here.

Next, referring to FIG. 2, description will be given below on operation of the data transmission control apparatus of the embodiment. First, the designation time is received from a system controller 107 via the transmitting/receiving processing unit 102, and this is set to a time designation processing unit 104. The designation time in this embodiment 2 designates a time to stop transmission of the data. The designation time is compared with the current time from a clock processing unit 103 at the designation time detection processing unit 105, and when these values agree with each other, a designation time detection signal is outputted. The transmitting/receiving processing unit 102 receives the designation time detection signal and stops transmission of the data from the device 106 currently being transmitted.

In the data transmission control apparatus of the embodiment 2 with the above arrangement, transmission from the digital device is stopped when the designation time is reached. As a result, it is possible to obtain the data transmission control apparatus for a digital device, which can use a transmission route at the highest efficiency without competing with the transmission of the data from the other device for the next transmission.

Embodiment 3

Figure 3:
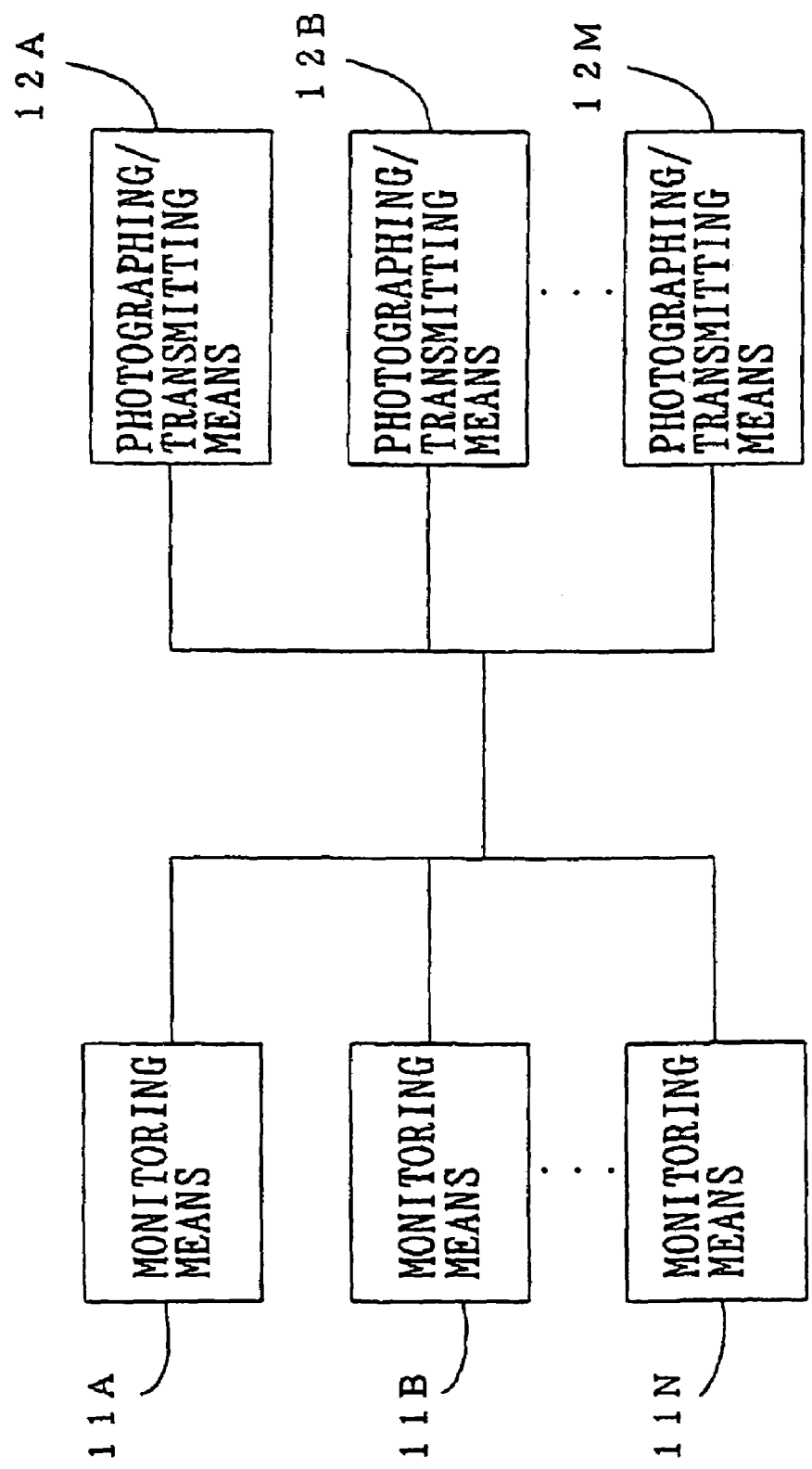
FIG. 3 is a block diagram of an overall arrangement of a photographing and monitoring system of a data transmission control apparatus in an embodiment 3 of the present invention.
Figure 4:
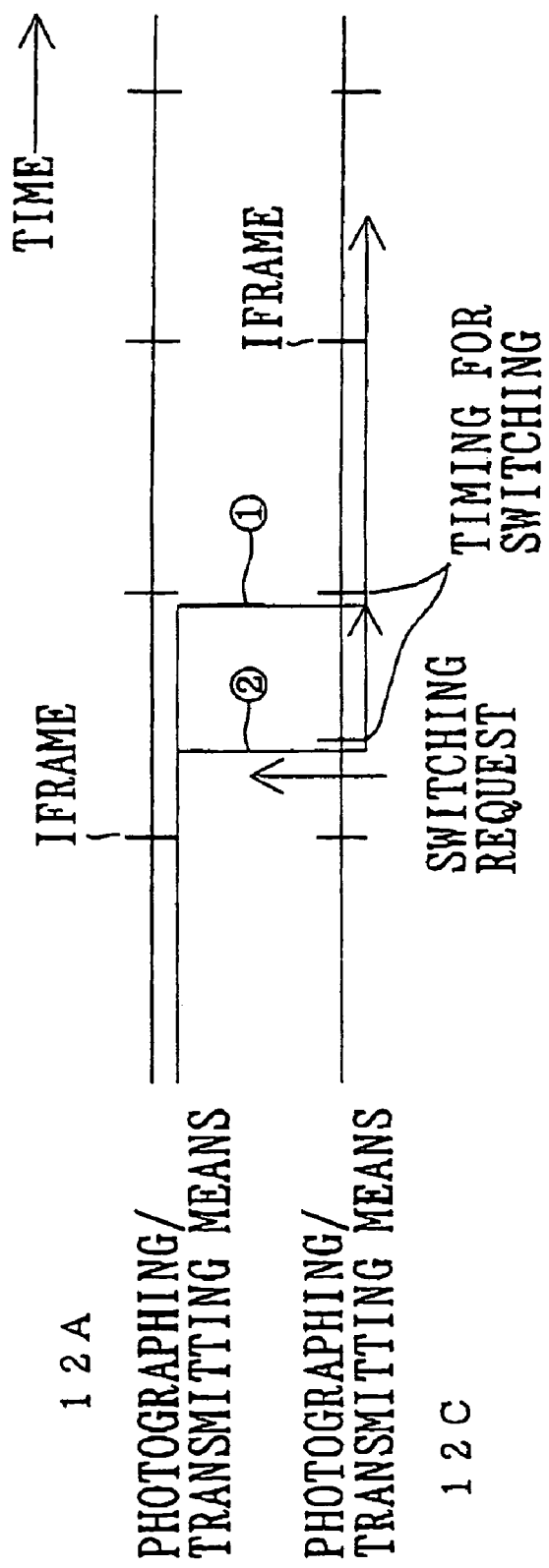
FIG. 4 is a drawing to explain operation of the data transmission control apparatus of the embodiment 3.
Figure 5:
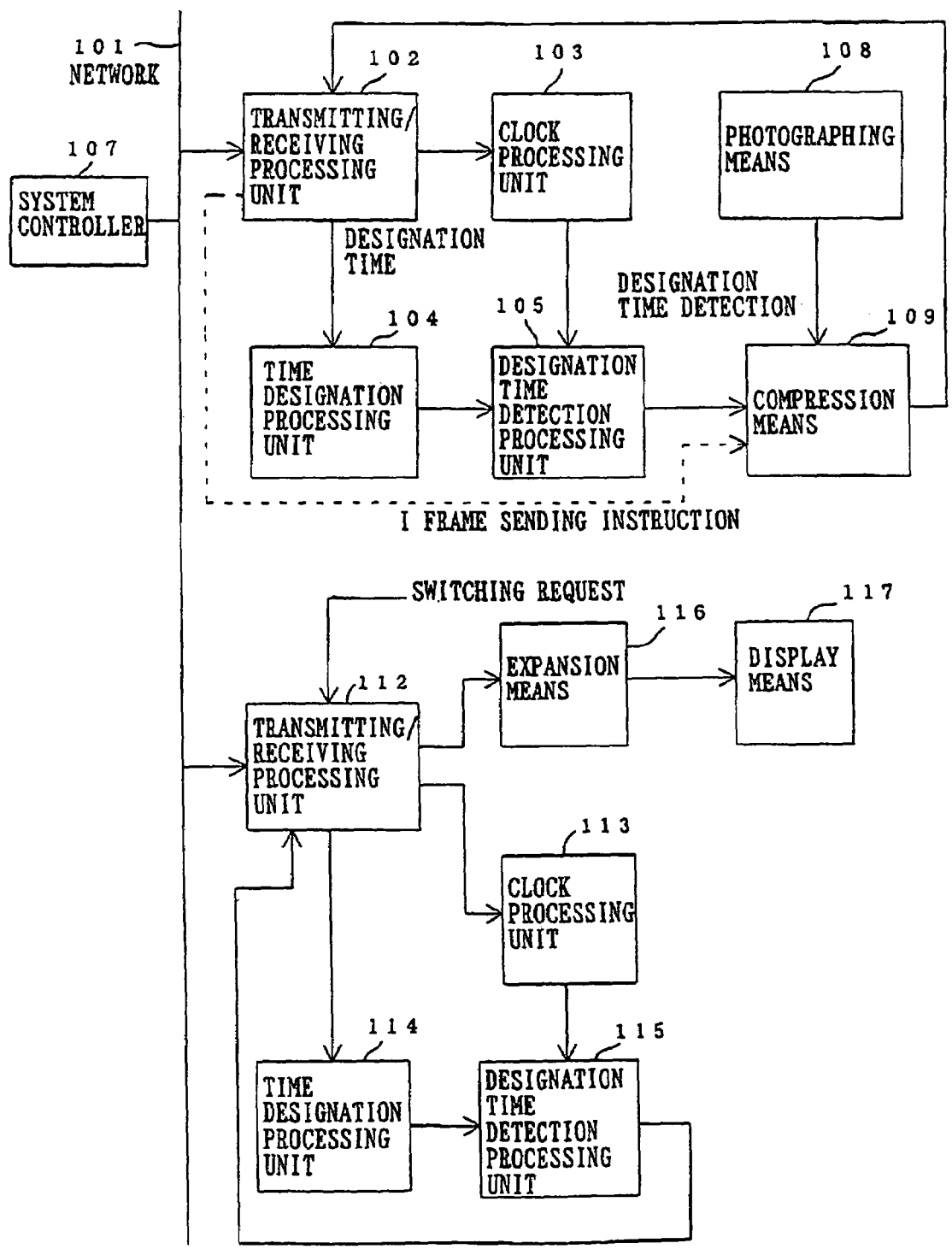
FIG. 5 is a block diagram of a data transmission control apparatus in the embodiment 3 of the present invention.

Next, referring to FIG. 3 to FIG. 5, description will be given on a data transmission control apparatus of an embodiment 3 of the present invention. FIG. 3 is a block diagram of the entire photographing/monitoring system of the data transmission control apparatus of the embodiment 3 of the present invention, and FIG. 4 is a drawing to explain the operation of the data transmission control apparatus in the embodiment 3. FIG. 5 is a block diagram showing an arrangement of the data transmission control apparatus of the embodiment 3 of the present invention.

First, referring to FIGS. 3 and FIGS. 5, description will be given on an arrangement of the data transmission control apparatus of the embodiment 3 of the present invention. In FIG. 3, reference numerals 12A to 12M each represents photographing/transmission means such as a digital camera. Reference numerals 11A to 11N each represents monitoring means such as a monitor unit.

In FIG. 5, reference numeral denotes a network for connecting a plurality of monitoring means and photographing means as shown in FIG. 3 and for transmitting image data between these devices, and 102 represents a transmitting/receiving processing unit for transmitting and receiving image data and control data to and from other digital devices. Reference numeral 103 represents a clock processing unit for setting a current time when the data is received. Reference numeral 104 is a time designation processing unit for setting the designation time received, and 105 is a designation time detection processing unit for outputting a designation time detection signal when the current time from the clock processing unit 103 is compared with the designation time from the time designation processing unit 104 and these values agree with each other.

Reference numeral 108 denotes photographing means for photographing an object and comprising a camera or the like, and 109 is compression means for receiving and compressing image data from the photographing means 108 and for outputting it to the transmitting/receiving processing unit 102, and also for receiving the designation time detection signal from the designation time detection processing unit 105 and for outputting I frame of the compressed image data. Reference numeral 107 is a system controller for controlling a device connected to the network 101. The transmitting/receiving processing unit 102, the clock processing unit 103, the time designation processing unit 104, the designation time detection processing unit 105, the photographing means 108, and the compression means 109 constitute, for example, the photographing means (also serving as the data transmission control apparatuses) 12A to 12M as shown in FIG. 3.

Further, in FIG. 5, reference numeral 112 denotes a transmitting/receiving processing unit for transmitting and receiving image data and control data to and from the other digital devices and for switching the channel to the digital device, to which the switching is requested, when the designation time is reached in response to a request for switching to the digital device on transmission side from a monitoring person. Reference numeral 113 is a clock processing unit for setting a current time as received, and 114 is a time designation processing unit for setting the designation time received.

Reference numeral 115 denotes a designation time detection processing unit for comparing the current time from the clock processing unit 113 with the designation time from the time designation processing unit 114 and for outputting a designation time detection signal when these time values agree with each other, and 116 represents expansion means for expanding the compressed image data as received so that the data can be displayed on screen. Reference numeral 117 is display means for displaying the expanded image data on screen. The transmitting/receiving processing unit 112, the clock processing unit 113, the time designation processing unit 114, the designation time detection processing unit 115, the expansion means 116, and the display means 117 constitute monitoring means (also serving as data transmission control apparatuses) 11A to 11N as shown in FIG. 3.

Next, referring to FIG. 3 to FIG. 5, description will be given below on the operation of the data transmission control apparatus of the embodiment 3 of the present invention. First, on the time designation processing unit 104 and the time designation processing unit 114 respectively, the system controller 107 sets an information of a time to transmit I frame of data to the monitoring means 11A to 11N and the photographing/transmitting means 12A to 12M.

Here, the operation of the photographing/transmitting means 12A to 12M will be described. As already described, the time to transmit I frame from the system controller 107 via the transmitting/receiving processing unit 102 is given to the time designation processing unit 104, and this time is given to the designation time detection processing unit 105. On the other hand, at the clock processing unit 103, the current time, as corrected according to the time of the packet indicating the time and received via transmitting/receiving means, is given to the designation time detection processing unit 105. At the designation time detection processing unit 105, the current time given from the clock processing unit 103 is compared with the designation time given from the time designation processing unit 104, and when these time values agree with each other, a designation time detection signal is given to compression means 106.

The information of the time to be given to the designation time detection processing unit 105 from the time designation processing unit 104 is not only given to a certain time point (e.g. T1) but it may be given to a time determined by logic (e.g. at every time T3 from a time T2). Next, at the compression means, compression processing is performed for transmitting I frame in synchronization with a timing given by the designation time detection signal to an image data given from the photographing means 108. Then, the compressed image data is transmitted over the network 101 via the transmitting/receiving means 102.

As described above, the compressed image data synchronized by I frame are transmitted from the photographing/transmitting means 12A to 12M over the network.

Next, the operation of the monitoring means 11A to 11N will be described. To the time designation processing unit 114, the time to transmit I frame from the system controller 107 via the transmitting/receiving processing unit 112 is given as already described, and this time is given to the designation time detection processing unit 115. On the other hand, at the clock processing unit 113, the current time, as corrected according to the time of the packet indicating the received time via transmitting/receiving means, is given to the designation time detection processing unit 115. At the designation time detection processing unit 115, the current time given from the clock processing unit 113 is compared with the designation time given from the time designation processing unit 114, and when these time values agree with each other, a designation time detection signal is given to the transmitting/receiving means 113.

As already described, the information of the time to be given to the designation time detection processing unit 115 from the time designation processing unit 114 is given not only to a certain single time, but it may be given to a time determined by logic. In this way, a timing of transmission of I frame for the compressed image data being transmitted over the network 101 is given to the transmitting/receiving means 112.

From the compressed image data transmitted over the network 101, the transmitting/receiving processing unit 112 receives the compressed image data from one of the photographing/transmitting means, and this is given to the expansion means 116. The expansion means 116 expands the compressed image data and gives it to the display means 117. The expanded image data is displayed by the display means 117.

Here, if a person in charge of monitoring gives a request for switching to the transmitting/receiving processing unit 112, the compressed image data received at a timing of the transmission of I frame is switched over at the transmitting/receiving processing unit 112. Therefore, when the compressed image data is switched over, I frame can be received promptly.

In the data transmission control apparatus of the embodiment 3 with the above arrangement, when the receiving of the image data from the photographing/transmitting means (e.g. 12A in FIG. 4) currently in transmission is stopped and it is switched over to the receiving of the image data from another photographing/transmitting means (e.g. 12C in FIG. 4) and if the request for switching is given in the middle of I frame, the switching of the image data can be postponed to the next I frame (shown by ① in FIG. 4) and this is carried out in synchronization. As a result, it is possible to obtain a data transmission control apparatus for digital device, in which the image is not interrupted during the period from the request for switching of the image data up to I frame.

Further, referring to FIG. 4, description will be given now on another method to control the data transmission control apparatus in the embodiment 3. In the example as described above, when the request for switching to the photographing means is made in the middle of I frame, the switching is postponed until the next I frame. However, as shown in ② of FIG. 4, it may be designed in such manner that I frame is sent out immediately after the request for switching and the switching may be made in synchronization with it. In such case, the designation time may be set to a time point immediately thereafter and I frame may be sent out when the compression means 109 of the photographing/transmitting means 12C on the switched side may send out I frame when the designation time is detected. Similarly, the monitoring means 11B on the switch-over requesting side may switch over the receiving channel in synchronization with the sending of I frame.

Further, as a switching method in more urgent case, a request may be given to send out I frame immediately to the photographing/transmitting means 12C by the transmitting/receiving processing unit 112 of the monitoring means 11B on the switch-over requesting side. Next, when the request is received at the transmitting/receiving processing unit 102 of the photographing/transmitting means 12C, an instruction to send out I frame is given to the compression means 109 to immediately send out I frame. As a result, the compressed image data of I frame generated at the compression means 109 is transmitted over the network 101. At the monitoring means 11B, an image data can be constructed from the compressed image data of I frame thus transmitted, and the image can be displayed with the minimum waiting time after the request for switching.

Embodiment 4

Figure 6:
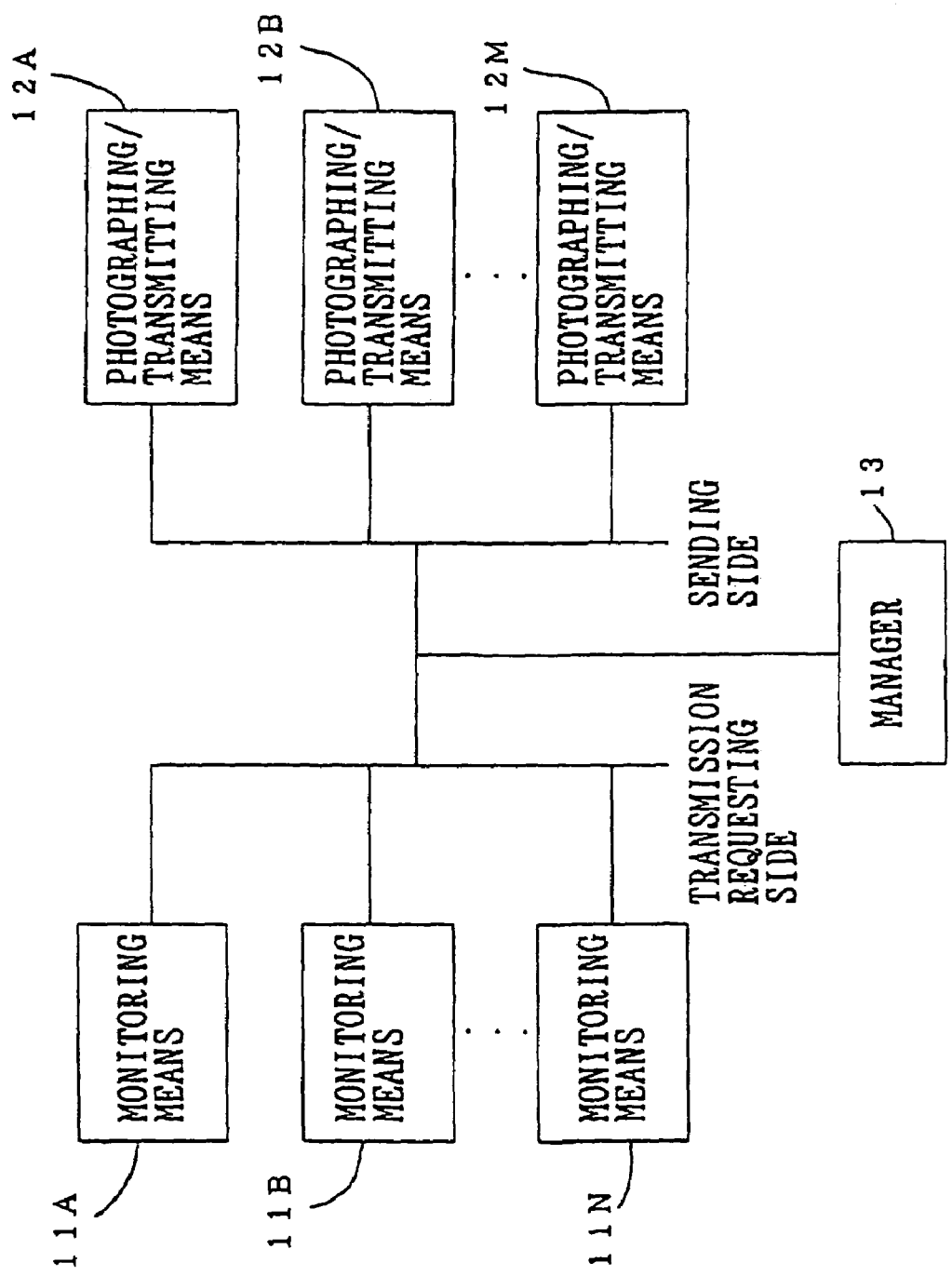
FIG. 6 is a block diagram of an overall arrangement of a data transmission control system comprising a data transmission control apparatus in an embodiment 4 of the present invention.
Figure 7:
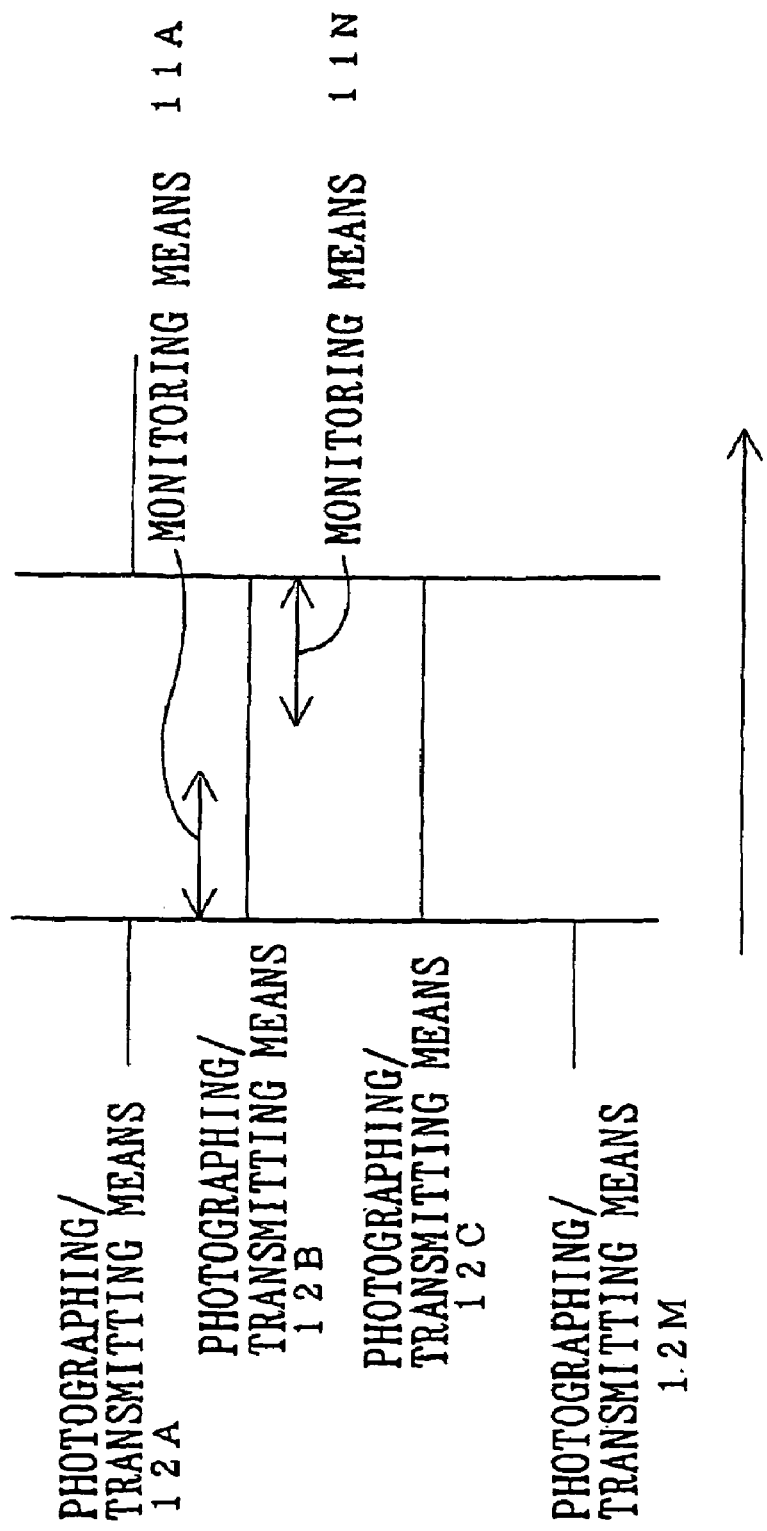
FIG. 7 is a timing diagram showing operation of the data transmission control system in the embodiment 4.

Next, referring FIG. 6 and FIG. 7, description will be given on a data transmission control system in an embodiment 4 of the present invention. FIG. 6 is a block diagram of the entire data transmission control system comprising a data transmission control apparatus in the embodiment 4 of the present invention, and FIG. 7 shows timing of operation of the data transmission control system in the embodiment 4.

In FIG. 6, reference numerals 12A to 12M each represents photographing/transmitting means comprising a digital camera, for example. Reference numerals 11A to 11N each represents monitoring means such as monitor unit, and reference numeral 13 denotes a manager for controlling the scheduling of data transmission between the monitoring means 11A to 11N and the photographing/transmitting means 12A to 12M to match the system controller 107 shown in FIG. 1, FIG. 2 and FIG. 5.

Next, referring to FIG. 6 and FIG. 7, description will be given on the operation of the data transmission control system comprising the data transmission control apparatus of the embodiment 4 of the present invention. The manager 13 performs the scheduling to control data transmission from the photographing/transmitting means 12A to 12M to the monitoring means 11A to 11N. For example, inquiries and request for data transmission to the photographing/transmitting means 12A to 12M from the monitoring means 11A to 11N are all responded by the manager 13. Upon the request of data transmission from the monitoring means 11A to 11N, the manager 13 performs scheduling and assigns the photographing/transmitting means 12A to 12M and the time. This assignment is controlled, for example, as shown in FIG. 7, in adequate time zone when the monitoring means 11A and 11N request the image data from the photographing/transmitting means 12B.

As another example of the scheduling by the manager 13, when much change does not occur on the screen, it can be controlled in such manner that the frequency to send out I frame is decreased to the photographing/transmitting means 12A to 12M and to elongate the distance between I frames. In this case, for example, the frequency to send I frame may be decreased from the compression means 109 of the photographing/transmitting means 12A to 12M as shown in FIG. 5.

As described above, by decreasing the frequency to send out I frame and by sending P frame (compressed image data prepared according to I frame after I frame) instead, compression efficiency can be increased and the better picture quality can be obtained.

In the data transmission control system of the embodiment 4 with the above arrangement, the manager for controlling the data transmission is connected to the network, to which a plurality of photographing/transmitting means 12A to 12M and a plurality of the monitoring means 11A to 11N are connected, and the scheduling is performed for the data transmission between the devices. As a result, it is possible to obtain a data transmission control system for the digital devices, in which data transmission can be controlled by the manager 13 in response to the condition of the data transmission and transmission efficiency can be increased without the need of individually inquiring to the photographing/transmitting means 12A to 12M from the monitoring means 11A to 11N.

Embodiment 5

Figure 8:
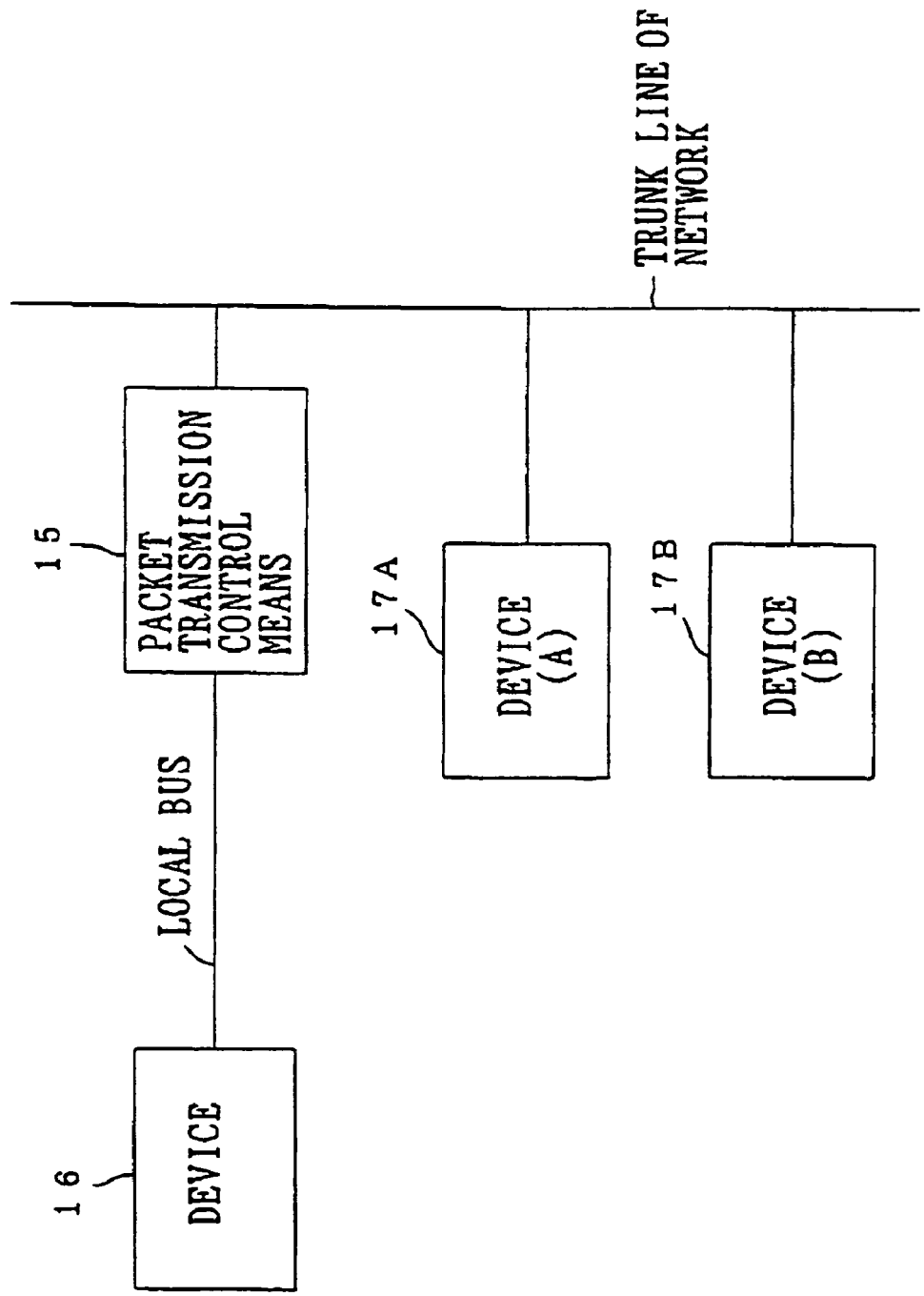
FIG. 8 is a block diagram showing an overall arrangement of a data transmission control apparatus in an embodiment 5 of the present invention.
Figure 10:
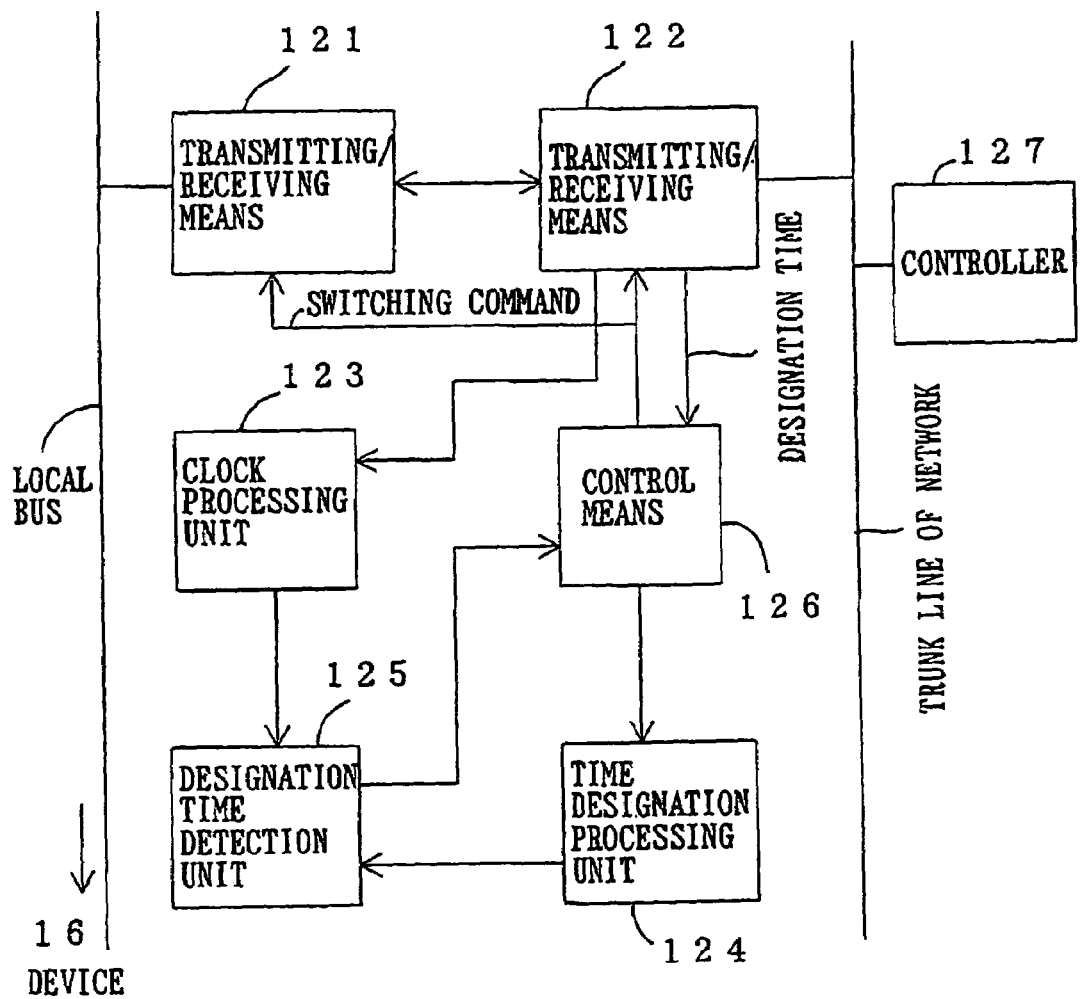
FIG. 10 is a block diagram showing an arrangement of a packet transmission control means shown in FIG. 8.

Next, referring to FIG. 8 and FIG. 10, description will be given on a data transmission control apparatus of an embodiment 5 of the present invention. FIG. 8 is a block diagram showing an arrangement of the entire data transmission control system comprising the data transmission control apparatus of the embodiment 5 of the present invention, and FIG. 10 is a block diagram showing an arrangement of packet transmission control means shown in FIG. 8. In FIG. 8, reference numeral 15 denotes packet transmission control means as a data transmission control apparatus for controlling the procedure to switch over transmission source of the data from devices 17A to 17B or from device 17B to 17A at a request of a device 16, and reference numeral 16 is a device for requesting data from a device 17B or from device 17A. Reference numerals 17A and 17B each represents a device for generating and transmitting data.

In FIG. 10, reference numeral 121 is transmitting/receiving means for requesting connection from the device 16 and for transmitting or receiving data, 122 is transmitting/receiving means for transmitting or receiving data to or from other devices such as 17A and 17B shown in FIG. 8, 123 is a clock processing unit for setting the current time received, 124 is a time designation processing unit for setting the received designation time, 125 is a designation time detection processing unit for comparing the current time from the clock processing unit 123 with the designation time from the time designation processing unit 124 and for outputting a designation time detection signal to control means 126 when these time values agree with each other, 126 indicates control means for setting the designation time from a controller 127 to the time designation processing unit 124 and for outputting a switching command to the transmitting/receiving means 121 and 122 when the designation time detection signal from the designation time detection processing unit 125 is received, and 127 is a controller for setting and controlling a designation time for switching of the device.

Next, referring to FIG. 8 and FIG. 10, the operation of the data transmission control apparatus in the embodiment 5 of the present invention will be described. First, in FIG. 8, it is assumed that the device 16 receives the data from the device 17A via a trunk line of the network and the packet transmission control means 15. Under such condition, it is supposed that the device 16 generates a request to switch over the data received by the device to the data from the device 17B. The switching operation is performed on the packet transmission control means 15.

In the packet transmission control means shown in FIG. 10, the controller 127 receiving the request to switch over the device outputs a designation time to switch over the device. The designation time is set on the time designation processing unit 124 via the transmitting/receiving means 122 and the control means 126. On the other hand, the clock processing unit 123 generates a current time corrected according to the time of the packet to indicate the time via the transmitting/receiving means 122 and the control means 126 and outputs it to the designation time detection processing unit 125. The designation time detection processing unit 125 receives the current time and also receives the designation time from the time designation processing unit 124. These two time values are compared with each other, and if they agree with each other, a designation time detection signal is outputted to the control means 126. Based on the designation time detection signal, the control means 126 outputs a switching command to the transmitting/receiving means 122, and the receiving of the data from the device 17A is switched over to the receiving of the data from the device 17B. The received data is outputted to a local bus via the transmitting/receiving means 121.

In the data transmission control system of the embodiment 5 with the above arrangement, the designation time to switch over the data sending device from an external controller is set in advance, and switching is performed in synchronization with the time. As a result, it is possible to obtain a data transmission apparatus for a digital device, which can accurately control the operation of the data transmitting device and the data receiving device in synchronization with the best timing determined in advance.

Embodiment 6

Figure 9:
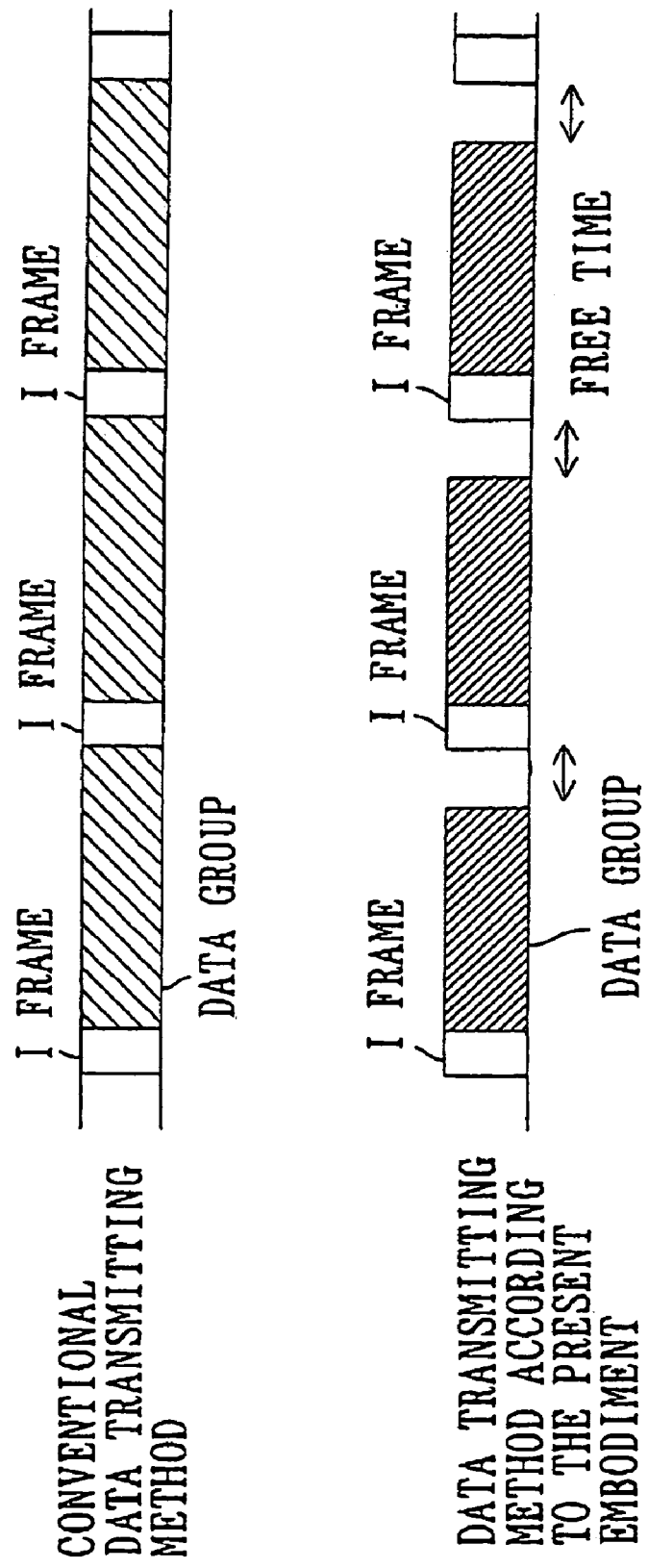
FIG. 9 is a drawing showing an arrangement of transmission data to explain a data transmission control method in an embodiment 6 of the present invention.

Next, referring to FIG. 9, description will be given on a data transmission control method in an embodiment 6 of the present invention. FIG. 9 is a drawing to show an arrangement of transmission data for explaining a data transmission control method in the embodiment 6 of the present invention. In FIG. 9, according to a conventional data transmission method, it is designed in such manner that, when the transmission of the data group after I frame has been completed, the transmission of I frame of the next data group is started.

According to the data transmission method of the present embodiment, it is not that the completion of the data transmission time is designated. For example, by controlling the amount of the data to be transmitted by the system controller, there is provided a free time, and additional surplus time is provided to cope with the increase of the amount of data during the period from the completion of the sending of the data group following I frame up to the sending of I frame of the next data group.

In the data transmission control method of the embodiment 6 with the above arrangement, the amount of the data to be transmitted is adjusted with respect to the transmissible data amount, and it is set to a relatively lower value and the transmission of the data group can be completed within the shortest time, and there is provided free time until the starting of transmission of the next data group. As a result, data transmission control method for a digital device can be obtained, by which it is possible to avoid the need of discarding the transmission data at the switching of the data group to be transmitted.

INDUSTRIAL APPLICABILITY

According to the present invention with the above arrangement, a designation time to operate the device from outside is set in advance. There is provided means for detecting the designation time, and the device is operated when the designation time is detected. As a result, a data transmission control apparatus for a digital device can be obtained, by which it is possible to accurately control the operation of the digital device at a predetermined timing without using an instruction packet for the operation of the digital device.

According to the present invention, in the transmission of the data from the device, a designation time for designating the time to complete the sending of the data is set in advance, and there is provided means for detecting the designation time. When this time is detected, the sending of the data is stopped. As a result, a data transmission control apparatus for a digital device can be obtained, by which it is possible to use a transmission route at the highest efficiency without competing with the data transmission from the other device, which transmits the next data.

According to the present invention, in the transmission of image data from the photographing/transmitting means to the monitoring means, a designation time to designate the time to switch over the photographing/transmitting means is set in advance at a switching request of the photographing/transmitting means, and there is provided means for detecting the designation time. Even in case a request to stop the receiving of the image data from the photographing/transmitting means currently in transmission and to switch over to the receiving of the image data from the other photographing/transmitting means is generated in the middle of I frame, the time to switch over the image data is determined in synchronization with the detection of the designated waiting time to the next I frame. As a result, it is possible to obtain a data transmission control apparatus for a digital device, in which the image is not interrupted from the request to switch over the image data to be transmitted from the photographing/transmitting means up to I frame.

According to the present invention, in case there is urgent need to switch over, a request to send out I frame is given to the photographing/transmitting means from the monitoring means. As a result, it is possible to obtain a data transmission control apparatus for a digital device, in which the image data can be acquired immediately from the compressed image data of I frame sent according to the instruction at the monitoring means and the image can be displayed within the shortest queuing time after the switching request.

According to the present invention, a manager for controlling data transmission is connected to a network, to which a plurality of devices for transmitting data such as photographing/transmitting means and a plurality of devices for receiving data such as monitoring means are connected, and the scheduling of data transmission is performed between the devices. As a result, it is possible to obtain a data transmission control system for a digital device, in which transmission efficiency can be increased by controlling the data transmission by the manager depending upon the conditions of the data or data transmission without individually inquiring to the data sending device from the data receiving device.

According to the present invention, particularly when the devices for transmitting and receiving the data are linked with each other and only the necessary data is transmitted to and from each other, and when the data to be transmitted is switched over, a designation time is set from the controller in advance, and the data to be transmitted is switched over in synchronization with the time. As a result, it is possible to obtain a data transmission control apparatus for a digital device, in which only the necessary data can be transmitted to and from each other in synchronization with the best timing determined in advance.

According to the present invention, it is set in such manner that there is less amount of data to be transmitted with respect to the transmissible data amount. The transmission of one data group is transmitted within the shortest time, and there is provided a free time up to the initiation of the transmission of the next data group. As a result, it is possible to obtain a data transmission control method for a digital device, in which discarding of transmission data at the time of switching of the data group to be transmitted can be avoided in the data transmission where the data amount to be transmitted is indefinite.

What is claimed is:

1. A data transmission control apparatus, comprising a clock processing unit for generating a current time corrected according to an information of a time received from a system controller via a network, a transmitting/receiving processing unit for transmitting and receiving data including compressed image data and control signal with respect to said network, a time designation processing unit for setting a designation time received from said system controller via said network, and a designation time detection processing unit for comparing said preset designation time with said current time, whereby, when said designation time is compared with said current time and these agree with each other, compression to send out I frames is performed and compressed image data of I frame is sent out.

2. The data transmission control apparatus according to claim 1, wherein an information of the designation time is maintained inside in advance.

3. A data transmission control apparatus, comprising a clock processing unit for generating a current time corrected according to an information of a time received from a system controller via a network, a transmitting/receiving processing unit for transmitting and receiving data and control signal with respect to said network, a time designation processing unit for setting a designation time received from said system controller via said network, and a designation time detection processing unit for comparing said preset designation time with said current time, whereby, when said designation time is compared with said current time and these agree with each other, the received data is switched over.

4. The data transmission control apparatus according to claim 3, wherein an information of the designation time is maintained inside in advance.

5. A data transmission control system, comprising
an arbitrary number of data transmission control apparatuses each having a clock processing unit for generating a current time corrected according to an information of a time received from a system controller via a network, a transmitting/receiving processing unit for transmitting and receiving data including compressed image data and control signal with respect to said network, a time designation processing unit for setting a designation time received from said system controller via said network, and a designation time detection processing unit for comparing said preset designation time with said current time, whereby, when said designation time is compared with said current time and these agree with each other, compressed image data of I frame is sent out; and
an arbitrary number of data transmission control apparatuses each having a clock processing unit for generating a current time corrected according to an information of a time received from a system controller via a network, a transmitting/receiving processing unit for transmitting and receiving data and control signal with respect to said network, a time designation processing unit for setting a designation time received from said system controller via said network, and a designation time detection processing unit for comparing said preset designation time with said current time, whereby, when said designation time is compared with said current time and these agree with each other, the received data is switched over;
said data transmission control apparatus being connected with each other over a network, whereby compressed image data received is switched over at a timing of transmission of an image data of I frame, which constitutes compressed image on the receiving side.

6. A data transmission control system, comprising a plurality of transmitting devices for transmitting compressed image data and a plurality of receiving devices for receiving compressed image data, all of said transmitting and receiving devices being connected with each other over a network, said system being arranged such that each of said receiving devices can be switched so as to receive compressed image data from a desired one of said transmitting devices, each of said receiving devices comprising means for sending, through said network, an I frame sending request to one of said transmitting devices, which one is the transmitting device from which compressed image data is to be received after switching, each of said transmitting devices comprising compressing means for generating said compressed image data, said compressing means being responsive to said I frame sending request to compress said image data of I frame thereby sending out compressed image data of I frame to said network, whereby when switching from one of said transmitting devices to another is performed with respect to one of said receiving devices, said transmitting device which is to transmit compressed image data after switching is able to send said compressed image data of I frame in response to said I frame sending request to said receiving device, which sent said I frame sending request, within a shortest time.

7. A data transmission control system as claimed in claim 6, comprising means for setting a data amount of image data including I frame constituting the compressed image to a value lower than a transmissible data amount, and means for providing free time up to arrival of the next data group.

8. A data transmission control system, comprising:
a plurality of photographing means each utilizing a data transmission control apparatus, having a clock processing unit for generating a current time corrected according to an information of a time received from a system controller via a network, a transmitting/receiving processing unit for transmitting and receiving data and control signal to and from said network, a time designation processing unit for setting a designation time received from said system controller via said network, and a designation time detection processing unit for comparing said preset designation time with said current time, whereby, as a result of said comparison, the sending of transmission data from external device is stopped by said transmitting/receiving processing unit when the present designation time is detected;
a plurality of monitoring means each utilizing a data transmission control apparatus, having a clock processing unit for generating a current time corrected according to an information of a time received from a system controller via a network, a transmitting/receiving processing unit for transmitting and receiving data and control signal with respect to said network, a time designation processing unit for setting a designation time received from said system controller via said network, and a designation time detection processing unit for comparing said preset designation time with said current time, whereby, when said designation time is compared with said current time and these agree with each other, the received data is switched over; and
a manager connected to a network, to which said plurality of photographing/transmitting means and said plurality of monitoring means are connected, said manager performing scheduling of data transmission between said plurality of photographing/transmitting means and said plurality of monitoring means.

9. The data transmission control system according to claim 8, wherein, in the scheduling by said manager, the sending of I frame of compressed image data is thinned out.

10. A data transmission control system, comprising:
a plurality of photographing means each utilizing a data transmission control apparatus, having a clock processing unit for generating a current time corrected according to an information of a time received from a system controller via a network, a transmitting/receiving processing unit for transmitting and receiving data including compressed image data and control signal with respect to said network, a time designation processing unit for setting a designation time received from said system controller via said network, and a designation time detection processing unit for comparing said preset designation time with said current time, whereby, when said designation time is compared with said current time and these agree with each other, sending out of compressed image data of I frame is terminated;
a plurality of monitoring means each utilizing a data transmission control system having an arbitrary number of data transmission control apparatuses each having a clock processing unit for generating a current time corrected according to an information of a time received from a system controller via a network, a transmitting/receiving processing unit for transmitting and receiving data including compressed image data and control signal with respect to said network, a time designation processing unit for setting a designation time received from said system controller via said network, and a designation time detection processing unit for comparing said preset designation time with said current time, whereby, when said designation time is compared with said current time and these agree with each other, compressed image data of I frame is snet out; and an arbitrary number of data transmission control apparatuses each having a clock processing unit for generating a current time corrected according to an information of a time received from a system controller via a network, a transmitting/receiving processing unit for transmitting and receiving data and control signal with respect to said network, a time designation processing unit for setting a designation time received from said system controller via said network, and a designation time detection processing unit for comparing said preset designation time with said current time, whereby, when said designation time is compared with said current time and these agree with each other, the received data is switched over; said data transmission control apparatuses being connected with each other over a network, whereby compressed image data received is switched over a timing of transmission of an image data of I frame, which constitutes compressed image on the receiving side; and
a manager connected to a network, to which said plurality of photographing/transmitting means and said plurality of monitoring means are connected, said manager performing scheduling of data transmission between said plurality of photographing/transmitting means and said plurality of monitoring means.

11. The data transmission control system according to claim 10, wherein, in the scheduling by said manager, the sending of I frame of compressed image data is thinned out.

12. A data transmission control system, comprising:
a plurality of photographing means each utilizing a data transmission control apparatus, having a clock processing unit for generating a current time corrected according to an information of a time received from a system controller via a network, a transmitting/receiving processing unit for transmitting and receiving data including compressed image data and control signal with respect to said network, a time designation processing unit for transmitting and receiving data including compressed image data and control signal with respect to said network, a time designation processing unit for setting a designation time received from said system controller via said network, and a designation time received from said system controller via said network, and a designation time detection processing unit for comparing said preset designation time with said current time, whereby, when said designation time is compared with said current time and these agree with each other, compressed image data of I frame is sent out;
a plurality of monitoring means each utilizing a data transmission control apparatus, having a clock processing unit for generating a current time corrected according to an information of a time received from a system controller via a network, a transmitting/receiving processing unit for transmitting and receiving data and control signal with respect to said network, a time designation processing unit for setting a designation time received from said system controller via said network, and a designation time detection processing unit for comparing said preset designation time with said current time, whereby, when said designation time is compared with said current time and these agree with each other, the received data is switched over; and
a manager connected to a network, to which said plurality of photographing/transmitting means and said plurality of monitoring means are connected, said manager performing scheduling of data transmission between said plurality of photographing/transmitting means and said plurality of monitoring means.

13. The data transmission control system according to claim 12, wherein, in the scheduling by said manager, the sending of I frame of compressed image data is thinned out.

14. A data transmission control system, comprising:
a plurality of photographing means each utilizing a data transmission control apparatus, having a clock processing unit for generating a current time corrected according to an information of a time received from a system controller via a network, a transmitting/receiving processing unit for transmitting and receiving data including compressed image data and control signal with respect to said network, a time designation processing unit for setting a designation time received from said system controller via said network, and a designation time detection processing unit for comparing said preset designation time with said current time, whereby, when said designation time is compared with said current time and these agree with each other, compressed image data of I frame is sent out;
a plurality of monitoring means each utilizing a data transmission control system
having an arbitrary number of data transmission control apparatuses each having a clock processing unit for generating a current time corrected according to an information of a time received from a system controller via a network, a transmitting/receiving processing unit for transmitting and receiving data including compressed image data and control signal with respect to said network, a time designation processing unit for setting a designation time received from said system controller via said network, and a designation time detection processing unit for comparing said preset designation time with said current time, whereby, when said designation time is compared with said current time and these agree with each other, compressed image data of I frame is sent out; and an arbitrary number of data transmission control apparatuses each having a clock processing unit for generating a current time corrected according to an information of a time received from a system controller via a network, a transmitting/receiving processing unit for transmitting and receiving data and control signal with respect to said network, a time designation processing unit for setting a designation time received from said system controller via said network, and a designation time detection processing unit for comparing said preset designation time with said current time, whereby, when said designation time is compared with said current time and these agree with each other, the received data is switched over; said data transmission control apparatuses being connected with each other over a network, whereby compressed image data received is switched over at a timing of transmission of an image data of I frame, which constitutes compressed image on the receiving side; and
a manager connected to a network, to which said plurality of photographing/transmitting means and said plurality of monitoring means are connected, said manager performing scheduling of data transmission between said plurality of photographing/transmitting means and said plurality of monitoring means.

15. The data transmission control system according to claim 14, wherein, in the scheduling by said manager, the sending of I frame of compressed image data is thinned out.

16. A data transmission control system, comprising:
a plurality of photographing means each utilizing a data transmission control apparatus, for use in a case wherein a plurality of devices for transmitting and a plurality of devices for receiving compressed image data are connected with each other over a network, said system being arranged such that when the compressed image data received on the receiving device is switched over, it is requested to send out I frame of compressed image data constituting the compressed image to the device for sending the compressed image data to be received newly, and compressed image data of frame is transmitted within the shortest time to the receiving device;
a plurality of monitoring means each utilizing a data transmission control apparatus, having a clock processing unit for generating a current time corrected
according to an information of a time received from a system controller via a network, a transmitting/receiving processing unit for transmitting and receiving data and control
signal with respect to said network, a time designation processing unit for setting a designation time received from said system controller via said network, and a designation time detection processing unit for comparing said preset designation time with said current time, whereby, when said designation time is compared with said current time and these agree with each other, the received data is switched over; and a manager connected to a network, to which said plurality of photographing/transmitting means and said plurality of monitoring means are connected, said manager performing scheduling of data transmission between said plurality of photographing/transmitting means and said plurality of monitoring means.

17. The data transmission control system according to claim 16, wherein, in the scheduling by said manager, the sending of I frame of compressed image data is thinned out.

18. A data transmission control system, comprising:
a plurality of photographing means each utilizing a data transmission control apparatus, for use in a case wherein a plurality of devices for transmitting and a plurality of devices for receiving compressed image data are connected with each other
over a network, said system being arranged such that when the compressed image data received on the receiving device is switched over, it is requested to send out I frame of compressed image data constituting the compressed image to the device for sending the compressed image data to be received newly, and compressed image data of I frame is transmitted within the shortest time to the receiving device;
a plurality of monitoring means each utilizing a data transmission control system having an arbitrary number of data transmission control apparatuses each having a clock processing unit for generating a current time corrected according to an information of a time received from a system controller via a network, a transmitting/receiving processing unit for transmitting and receiving data including compressed image data and control signal with respect to said network, a time designation processing unit for setting a designation time received from said system controller via said network, and a designation time detection processing unit for comparing said preset designation time with said current time, whereby, when said designation time is compared with said current time and these agree with each other, compressed image data of I frame is sent out; and an arbitrary number of data transmission control apparatuses each having a clock processing unit for generating a current time corrected according to an information of a time received from a system controller via a network, a transmitting/receiving processing unit for transmitting and receiving data and control signal with respect to said network, a time designation processing unit for setting a designation time received from said system controller via said network, and a designation time detection processing unit for comparing said preset designation time with said current time, whereby, when said designation time is compared with said current time and these agree with each other, the received data is switched over; said data transmission control apparatuses connected with each other over a network, whereby compressed image data received is switched over at a timing of transmission of an image data of I frame, which constitutes compressed image on the receiving side; and
a manager connected to a network, to which said plurality of photographing/transmitting means and said plurality of monitoring means are connected, said manager performing scheduling of data transmission between said plurality of photographing/transmitting means and said plurality of monitoring means.

19. The data transmission control system 25 according to claim 18, wherein, in the scheduling by said manager, the sending of I frame of compressed image data is thinned out.

20. A data transmission control apparatus to be connected between a network and a device which receives data from said network, said data transmission control apparatus comprising
a device control apparatus, comprising:
a clock processing unit for generating a current time corrected according to an information of a time received from a system controller via a network;
a time designation processing unit for setting a designation time received from said system controller via said network; and
a designation time detection processing unit for comparing said preset designation time with said current time, whereby, as a result of said comparison, operation of said device is controlled when the preset designation time is reached so that data to be relayed to said device is switched over when the preset designation time is detected.

* * * * *